(12) United States Patent
Ayanam et al.

(10) Patent No.: US 8,843,607 B2
(45) Date of Patent: Sep. 23, 2014

(54) SYSTEM AND METHOD FOR MANAGING COMPUTER NETWORK INTERFACES

(75) Inventors: Varadachari Sudan Ayanam, Suwanee, GA (US); Baskar Parthiban, Johns Creek, GA (US)

(73) Assignee: American Megatrends, Inc., Norcross, GA (US)

( * ) Notice: Subject to any disclaimer, the term of this patent is extended or adjusted under 35 U.S.C. 154(b) by 529 days.

(21) Appl. No.: 12/895,245

(22) Filed: Sep. 30, 2010

(65) Prior Publication Data
US 2012/0084420 A1    Apr. 5, 2012

(51) Int. Cl.
| G06F 15/16 | (2006.01) |
| G06F 15/177 | (2006.01) |
| G06F 15/173 | (2006.01) |
| H04L 12/64 | (2006.01) |

(52) U.S. Cl.
CPC ................... *H04L 12/6418* (2013.01)
USPC ........... 709/223; 709/217; 709/218; 709/219; 709/220; 709/221; 709/222; 709/224

(58) Field of Classification Search
USPC .................. 709/217–219, 220–224
See application file for complete search history.

(56) References Cited

U.S. PATENT DOCUMENTS

| 5,768,568 A | 6/1998 | Inui et al. |
| 6,356,965 B1 * | 3/2002 | Broyles et al. ................ 710/104 |
| 6,385,682 B1 * | 5/2002 | Emerson et al. .............. 710/260 |
| 6,490,637 B1 | 12/2002 | Shih |
| 6,496,858 B1 | 12/2002 | Frailong et al. |
| 6,560,704 B2 | 5/2003 | Dieterman et al. |
| 6,792,479 B2 | 9/2004 | Allen et al. |
| 7,605,689 B2 | 10/2009 | Hein et al. |
| 7,856,549 B2 * | 12/2010 | Wheeler ........................ 713/1 |
| 8,115,448 B2 | 2/2012 | John |
| 8,362,745 B2 | 1/2013 | Tinaphong |
| 2002/0087724 A1 | 7/2002 | Datta et al. |
| 2003/0185233 A1 | 10/2003 | Ji et al. |
| 2003/0233450 A1 * | 12/2003 | Carley ......................... 709/224 |
| 2005/0091360 A1 * | 4/2005 | Chen et al. .................... 709/223 |
| 2005/0108519 A1 * | 5/2005 | Barton et al. ................. 713/155 |
| 2005/0149924 A1 | 7/2005 | Komarla et al. |
| 2005/0188070 A1 | 8/2005 | Tripathi et al. |
| 2005/0257040 A1 * | 11/2005 | Choi et al. ........................ 713/1 |
| 2007/0002826 A1 | 1/2007 | Bennett et al. |
| 2008/0021978 A1 | 1/2008 | Maynard et al. |
| 2008/0037553 A1 | 2/2008 | Gilmartin et al. |
| 2008/0184022 A1 | 7/2008 | Peacock |
| 2009/0102296 A1 | 4/2009 | Greene et al. |
| 2009/0282284 A1 * | 11/2009 | Naohiro et al. .................. 714/4 |
| 2010/0005283 A1 * | 1/2010 | Ha ................................. 713/2 |

(Continued)

*Primary Examiner* — Edward Kim
(74) *Attorney, Agent, or Firm* — Morris Manning & Martin, LLP; Tim Tingkang Xia, Esq.

(57) ABSTRACT

According to one aspect, a computer-implemented method for managing at least one network interface of a computer system is disclosed. In one embodiment, the method includes the steps of executing of a boot loader to initialize a dedicated network interface and a side-band network interface, determining if a boot loader priority setting designates a preference to use one of a detected dedicated network interface or side-band network interface, determining if preferred network interface is available for use, then passing the priority setting to an operating system to use for network communications during run time.

20 Claims, 2 Drawing Sheets

(56) References Cited

U.S. PATENT DOCUMENTS

| | | |
|---|---|---|
| 2010/0090656 A1 | 4/2010 | Shearer et al. |
| 2010/0115253 A1 | 5/2010 | Lipsky et al. |
| 2010/0180031 A1 | 7/2010 | Cacheria et al. |
| 2011/0055824 A1 | 3/2011 | Benari |
| 2011/0202983 A1 | 8/2011 | Pope et al. |
| 2011/0276625 A1 | 11/2011 | Shah |
| 2011/0292807 A1 | 12/2011 | Shah et al. |
| 2011/0296130 A1 | 12/2011 | Abe et al. |

* cited by examiner

SYSTEM AND METHOD FOR MANAGING COMPUTER NETWORK INTERFACES

FIELD OF THE INVENTION

The present invention generally relates to computer networks, and more particularly to a system and method for managing network interfaces of a computer system.

BACKGROUND OF THE INVENTION

Remote server management devices allow various operational aspects of a server computer to be viewed and controlled from a management application executing on a remotely located computer. For instance, a remote management device may be utilized to remotely troubleshoot the operation of a managed server computer and to restart a failed server computer. One such type of management device is a "Baseboard Management Controller" (BMC). A BMC is a microcontroller integrated into the baseboard (also known in the industry as the "motherboard") of a computer system, having a specified number of contact pins through which information sensed by various sensors is received for analysis by the BMC. In order to perform this analysis, the BMC is programmed with firmware for implementing procedures relating to system monitoring and recovery. With this firmware, the BMC is programmed to monitor various operating and performance-related parameters sensed within a computer system and to analyze this information to determine whether any of the sensed parameters are currently outside of an expected or recommended operating range.

In order to provide the functionality described above, remote server management devices may include a dedicated network interface for communicating with a remote management client. Because communication with the remote management device in this manner is not dependent upon the operation of the managed server computer, this type of communication is referred to as "out-of-band" communication. Out-of-band management allows management data to be retrieved from the remote management device and other actions to be performed, such as resetting a server computer, even when the managed server computer has not yet booted or an operating system is unresponsive. Remote server management devices may also include a network interface for "side-band" communication. Side-band communication may utilize a system management bus interface between the remote management controller and a network interface controller on the managed server computer.

Side-band network connections may cost less to operate as compared to dedicated network connections, for example in terms of service fees charged by a network provider. Side-band connections support basic functions for remote management of a managed computer, such as remotely checking the event log, accessing the BIOS setup, and performing basic power-on power-off or power cycles. Side-band connections provide limited bandwidth in comparison to dedicated network connections and may not support more advanced management functions that are available through dedicated network connections, such as remote re-installation of an operating system. Accordingly, each of dedicated network communications and side-band communications have individualized particular advantages, and one or the other form of network connection may be needed or preferred for differing system architectures or particular needs. In order to use either dedicated or side-band connections, however, detection of connected devices to a remote management controller need to be made, to determine availability and operable status. There is a need for dynamic detection of network interfaces in a remote management system to selectively use during run time. Further, there is a need for priority-based selection of one or more particular interfaces according to priority settings that can be modified during run time.

Therefore, a heretofore unaddressed need still exists in the art to address the aforementioned deficiencies and inadequacies.

SUMMARY OF THE INVENTION

One aspect of the present invention relates to automatic detection of a network interface to use during run time. According to one particular embodiment of the present invention, there are at least two ways to perform automatic detection of a network interface to use. According to one such way, a baseboard management controller runs a boot loader that initializes network interfaces and other key hardware components of a computer system, including a dedicated network interface and a side-band network interface. In an exemplary embodiment, the boot loader, when executed, will first initialize the dedicated network interface and determine if it is available to use, by verifying its PHY link status. If available, the dedicated network interface will be used. If the dedicated network interface is not available, then the boot loader will initialize the side-band network interface and check for its availability by verifying its PHY link status. If available, the side-band network interface will be used. Those skilled in the art will recognize that PHY refers to the physical layer of the Open System Interconnection (OSI) model. Thus, according to one exemplary embodiment, higher priority is given to the dedicated network interface and the priority is decided during compile time. The detected network interface to be used is then passed on to an operating system to be used for network communication functions.

Another exemplary embodiment of the present invention is directed to a second way to perform automatic detection of a network interface to use during run time. In this embodiment, a U-Boot environment variable is used to change a priority setting. In particular, a U-Boot environment variable "ethtouse" is set with a value indicating which of the dedicated network interface and side-band network interface has first priority, that is, which one will be checked for availability and, if available, passed on to the operating system to be used for network communication functions. Those skilled in the art will recognize that U-Boot is an open source universal boot loader which can be implemented on many different computer architectures. Initially it can be set to give first priority status to the dedicated network interface. The boot loader, upon execution, reads this environment variable for its value and based on its value, initializes the particular network interface given priority and checks it for availability. If the network interface having priority is available, it will be passed on to the operating system to be used for network communication functions. One attractive aspect of using a U-Boot environment variable is that it can be overwritten during run time, such that the network interface detection priority can be modified as desired by a specific user.

In another aspect, the present invention relates to a computer-implemented method for managing network communications interfaces of a computer system. In one embodiment of the method, execution of a boot loader is initiated, where the boot loader is operative to initialize a dedicated network interface and/or a side-band network interface. Each of the dedicated network interface and/or side-band network interface is operative to communicatively connect a management controller to one or more hardware components, via one or more network connections. It is determined if a boot loader environment priority setting is present. A priority setting may indicate a priority for use of one of a dedicated network interface or a side-band network interface. The boot loader environment priority setting can be modified during run time. If a priority setting is present which indicates that a dedicated network interface has a higher priority than a side-band network interface, then it is determined if an operable dedicated network interface is available to be used by the computer system for network communications. If an operable dedicated network interface is available, then a computer operating system is booted with a configuration which indicates that the dedicated network interface should be used for network communications. Further, it is determined if a priority setting is present which indicates that a side-band network interface has a higher priority than a dedicated network interface. It is then determined if an operable side-band network interface is available. If an operable side-band network interface is available, a computer operating system is booted with a configuration which indicates that the side-band network interface should be used for network communications. In one embodiment, determining if an operable dedicated network interface is available and determining if an operable side-band network interface is available include verifying a PHY link status of the dedicated network interface and verifying the PHY link status of the side-band network interface, respectively.

In one embodiment, the computer system includes a system management bus that is operative to communicatively couple the management controller to the dedicated network interface and/or side-band network interface. The boot loader environment priority setting can be a U-Boot environment setting that is modifiable by a user of the computer system during run time.

In one embodiment, the one or more hardware components include an environmental monitoring sensor, power control means, and/or mass storage means. The management controller is a baseboard management controller of a managed host computer that includes the one or more hardware components and one or more network interfaces. The baseboard management controller is communicatively coupled to a remote management computer that is operative to control operation of the baseboard management controller and communicate data associated with operations of the one or more hardware components, via the at least one network connection.

According to another aspect, the present invention relates to a computer-readable medium that contains stored computer-executable instructions which, when executed by one or more processors, cause a computer to perform functions for managing one or more network interfaces of a computer system. In one embodiment, the functions performed include initiating the execution of a boot loader that is operative to initialize a dedicated network interface and/or side-band network interface. Each of the dedicated network interface and/or side-band network interface is operative to communicatively connect a management controller to at least one of the one or more hardware components via one or more network connections. The functions performed further include determining if a boot loader environment priority setting is present. The priority setting may indicate a priority for use of a dedicated network interface or a side-band network interface. The boot loader environment priority setting can be modified by a user of the computer system during run time. The priority setting can be, for example, a U-Boot environment setting.

If a priority setting is present and the setting indicates a priority for use of a dedicated network interface over a side-band network interface, then it is determined if an operable dedicated network interface is available for use by the computer system for network communications. If an operable dedicated network interface is available, an operating system of the computer system is booted with a configuration to use the dedicated network interface for network communications. If a priority setting is present that indicates a priority for use of a side-band network interface over a dedicated network interface, then it is determined if an operable side-band network interface is available. If an operable side-band network interface is available, an operating system is booted with a configuration to use the side-band network interface for network communications. In one embodiment, determining if an operable dedicated network interface is available and determining if an operable side-band network interface is available include verifying a PHY link status of the dedicated network interface and verifying the PHY link status of the side-band network interface, respectively.

In one embodiment, the management controller is a baseboard management controller of a managed host computer that has one or more hardware components. The baseboard management controller is communicatively coupled to a remote management computer that is operative to control operation of the baseboard management controller and to communicate data associated with operations of the one or more hardware components, via a network connection. In one embodiment, the hardware components include an environmental monitoring sensor, power control means, and mass storage means. In one embodiment, the computer system includes a system management bus that is operative to communicatively couple the management controller to the dedicated network interface and/or the side-band network interface.

According to yet another aspect, the present invention relates to a computer system for managing one or more network interfaces. In one embodiment, the computer system includes a management controller, one or more hardware components, and a dedicated network interface and/or side-band network interface. Each of the dedicated network interface and/or side-band network interface is operative to communicatively connect the management controller to the one or more hardware components, via one or more network connections. The computer system also includes a programmable processor that is programmed to perform functions for managing the dedicated network interface and/or side-band network interface.

In one embodiment, the functions performed by the processor include initiating the execution of a boot loader that is operative to initialize the dedicated network interface and/or side-band network interface. The functions performed also include determining if a boot loader environment priority setting is present. The priority setting may indicate a priority for use of a dedicated network interface or a side-band network interface for network communications. The priority setting can be modified during run time, and can be, for example, a U-Boot environment setting. If a priority setting is present that indicates a priority for use of a dedicated network interface, then it is determined if an operable dedicated network interface is available to be used by the computer system for network communication. If an operable dedicated network interface is available, an operating system is booted with a configuration to use the dedicated network interface for network communications. If a priority setting is present that indicates a priority for use of a side-band network interface, then it is determined if an operable side-band network interface is available. If an operable side-band network interface is available, an operating system is booted with a configuration to use the side-band network interface for network communications.

In one embodiment, the management controller is a baseboard management controller of a managed host computer that has the one or more hardware components. The baseboard management controller is communicatively coupled to a remote management computer that is operative to control operation of the baseboard management controller and to communicate data associated with operations of the one or more hardware components, via the one or more network connections. In one embodiment, the hardware components include an environmental monitoring sensor, power control means, and mass storage means.

In one embodiment, the computer system includes a system management bus that is operative to communicatively couple the management controller to the dedicated network interface and/or side-band network interface.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
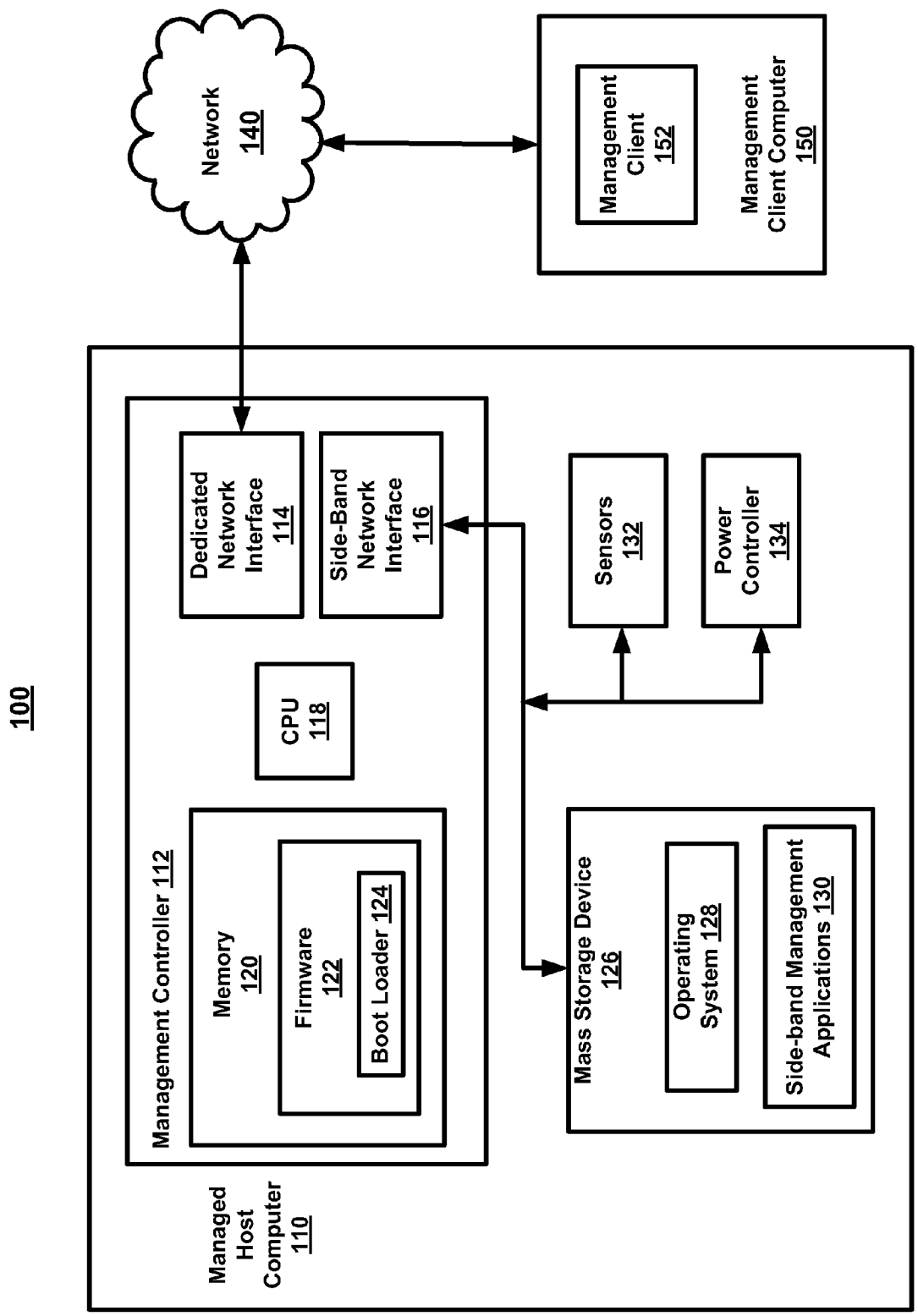
FIG. 1 schematically shows a computer system for network communications using network interfaces managed by a remote management controller of a managed host computer, and also shows a management client computer for managing operations of the remote management controller at the host computer, according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings in FIGS. 1-3. In one aspect, the present invention relates to a computer-implemented method 200 for managing at least one network interface 114, 116 of a computer system 100. In one embodiment, the method includes the step 201 of initiating the execution of a boot loader 124 that is operative to initialize a dedicated network interface 114 and/or a side-band network interface 116. Each of the dedicated network interface 114 and/or side-band network interface 116 is operative to communicatively connect a management controller 112 to one or more hardware components 126, 132, 134, via one or more network connections. The method 200 further includes the step 203 of determining if a boot loader environment priority setting is present, where the priority setting may indicate a priority for use of a dedicated network interface 114 or a side-band network interface 116. The boot loader environment priority setting can be modified during run time.

At steps 205, 207, and 209 it is determined if a priority setting is present that indicates a priority for use of a dedicated network interface 114. At step 207 it is determined if an operable dedicated network interface 114 is available for use by the computer system 100 for network communications, and at step 209, if an operable dedicated network interface 114 is available, an operating system 128 is booted with a configuration to use the dedicated network interface 114 for network communications. As used herein, an "operable" network interface refers to a detectable network interface that is both communicatively connected to the management controller and readily available to perform network communication functions such as sending and receiving data over a network such as network 140.

As shown at steps 211 and 213, if a priority setting is present that indicates a priority for use of a side-band network interface 116, then at step 211 it is determined if an operable side-band network interface 116 is available. At step 213, if an operable side-band network interface 116 is available, then an operating system 128 is booted with a configuration to use the side-band network interface 116 for network communications. In one embodiment, determining if an operable dedicated network interface 114 is available and determining if an operable side-band network interface 116 is available include verifying a PHY link status of the dedicated network interface 114 and verifying the PHY link status of the side-band network interface 116, respectively.

In one embodiment, the computer system 100 includes a system management bus that is operative to communicatively couple the management controller 112 to the dedicated network interface 114 and/or side-band network interface 116. The boot loader environment priority setting can be a U-Boot environment variable/setting that is modifiable by a user of the computer system 100 during run time.

In one embodiment, the one or more hardware components 126, 132, 134 include an environmental monitoring sensor 132, power control means 134, and mass storage means 126. The management controller 112 is a baseboard management controller of a managed host computer 110 that includes the one or more hardware components 126, 132, 134. The baseboard management controller 112 may be a MegaRAC SP baseboard management controller, available from American Megatrends, Inc. In one embodiment, the baseboard management controller 112 is communicatively coupled to a remote management computer 150 executing a management client application 152 that is operative to control operation of the baseboard management controller 112 and communicate data associated with operations of the one or more hardware components 126, 132, 134, via the at least one network connection.

According to another aspect, the present invention relates to a computer-readable medium that contains stored computer-executable instructions which, when executed by one or more processors 118, cause a computer to perform functions 200 for managing one or more network interfaces 114, 116 of a computer system 100. The computer-readable medium may include volatile or non-volatile storage means such as one or more of RAM, ROM, EPROM, EEPROM, flash memory or other solid state memory technology, DVD, HD-DVD, BLU-RAY, or other medium which can be used to store computer-accessible data such as computer-executable instructions executable by a processor to cause a computer to perform functions according to one or more aspects of the present invention disclosed herein.

In one embodiment, the functions performed include, at step 201, initiating the execution of a boot loader 124 that is operative to initialize a dedicated network interface 114 and/or side-band network interface 116. Each of the dedicated network interface 114 and/or side-band network interface 116 is operative to communicatively connect a management controller 112 to at least one of the hardware components 126, 132, 134, via one or more network connections. The functions performed further include, at step 203, determining if a boot loader environment priority setting is present. The priority setting may indicate a priority for use of a dedicated network interface 114 or a side-band network interface 116. The boot loader environment priority setting can be modified by a user of the computer system 100 during run time. The priority setting can be, for example, a U-Boot environment setting.

As shown at steps 205, 207, and 209, if a priority setting is present that indicates a priority for use of a dedicated network interface, then at step 207 it is determined if an operable dedicated network interface 114 is available for use by the computer system 100 for network communications. At step 209, if an operable dedicated network interface 114 is available, an operating system 128 of the computer system 100 is booted with a configuration to use the dedicated network interface 114 for network communications. If a priority setting is present that indicates a priority for use of a side-band network interface 116, then at step 211 it is determined if an operable side-band network interface 116 is available. At step 213, if an operable side-band network interface 116 is available, then an operating system 128 is booted with a configuration to use the side-band network interface 116 for network communications.

In one embodiment, the management controller 112 is a baseboard management controller of a managed host computer 110 that has the one or more hardware components 126, 132, 134. The baseboard management controller 112 is communicatively coupled to a remote management computer 150 that is operative to control operation of the baseboard management controller 112 and to communicate data associated with operations of the one or more hardware components 126, 132, 134 via the at least one network connection. The one or more hardware components 126, 132, 134 include an environmental monitoring sensor 132, power control means 134, and mass storage means 126.

In one embodiment, the computer system 100 includes a system management bus that is operative to communicatively couple the management controller 112 to the dedicated network interface 114 and/or the side-band network interface 116.

According to yet another aspect, the present invention relates to a computer system 100 for managing one or more network interfaces 114, 116. In one embodiment, the computer system 100 includes a management controller 112, one or more hardware components 126, 132, 134, and a dedicated network interface 114 and/or side-band network interface 116. Each of the dedicated network interface 114 and/or side-band network interface is operative to communicatively connect the management controller 112 to the one or more hardware components 126, 132, 134, via one or more network connections. The computer system 100 also includes a programmable processor 118 that is programmed to perform functions 200 for managing the dedicated network interface 114 and/or side-band network interface 116.

In one embodiment, the functions 200 performed by the processor 118 include, at step 201, initiating the execution of a boot loader 124 that is operative to initialize the dedicated network interface 114 and/or side-band network interface 116. The functions performed also include, at step 203, determining if a boot loader environment priority setting is present. The priority setting may indicate a priority for use of a dedicated network interface 114 or a side-band network interface 116 for network communications. The priority setting can be modified during run time, and can be, for example, a U-Boot environment setting. As shown at steps 205, 207, and 209, if a priority setting is present that indicates a priority for use of a dedicated network interface 114, then at step 207 it is determined if an operable dedicated network interface 114 is available to be used by the computer system for network communication. At step 209, if an operable dedicated network interface 114 is available, an operating system 128 is booted with a configuration to use the dedicated network interface 114 for network communications. As shown at steps 211 and 213, if a priority setting is present that indicates a priority for use of a side-band network interface 116, then at step 211 it is determined if an operable side-band network interface 116 is available. At step 213, if an operable side-band network interface 116 is available, an operating system 128 is booted with a configuration to use the side-band network interface 116 for network communications.

In one embodiment, the management controller 112 is a baseboard management controller of a managed host computer 110 that has the one or more hardware components 126, 132, 134. The baseboard management controller 112 is communicatively coupled to a remote management computer 150 that is operative to control operation of the baseboard management controller 112 and to communicate data associated with operations of the one or more hardware components 126, 132, 134, via the one or more network connections. The one or more hardware components 126, 132, 134 include an environmental monitoring sensor 132, power control means 134, and mass storage means 126.

In one embodiment, the computer system 100 includes a system management bus that is operative to communicatively couple the management controller 112 to the dedicated network interface 114 and/or side-band network interface 116.

Now specifically referring to FIG. 1, a computer system 100 for network communications using network interfaces 114, 116 managed by a remote management controller 112 of a managed host computer 110 is shown, as well as a management client computer 150 for managing operations of the remote management controller 112 at the host computer 110, according to one embodiment of the present invention. Although the computer system 110 and/or management client computer 150 shown in FIG. 1 is directed to the context of server computers or network-enabled personal computers, those skilled in the art will appreciate that aspects of the present invention may also be practiced with other computer system configurations such as handheld devices, multiprocessor systems, programmable consumer electronics, minicomputers, and mainframe computers.

A remote management controller 112 is presented herein that operates in conjunction with a managed host computer 110. The remote management controller 112 may be integrated with the system board of the managed host computer 102 or may be a daughtercard or other type of add-in card that is installed into the managed host computer 110. Alternatively, the remote management controller 112 may be configured as an external device to the managed host computer 112. As will be described in greater detail below, the remote management controller 112 provides functionality for remotely managing the operation of the managed host computer 110. In particular, according to exemplary embodiments, the remote management controller 112 includes a dedicated network interface 114 for establishing a dedicated network connection to the network 140. Through the network 140, a remotely located management client computer 110 can establish a connection to the remote management controller 112. The management client computer 110 can include an operating system (not shown) and a management client application 152 for communicating with and controlling the operation of the remote management controller 112. Through the use of the management client 152, a remotely located user of the management client computer 150 can access information regarding the health and operation of the managed host computer 110. In this regard, the remote management controller 112 monitors and manages environmental sensors 132 within the managed host computer 110. The remote management controller 112 also maintains appropriate connections to a power controller 134 on the managed host computer 110 to allow the remote management controller 112 to control the power status of the managed host computer 110. For instance, a remotely located user can utilize the management client 152 to power the managed host computer 110 on or off. The remote management controller 112 may receive power directly from the managed host computer 110, from an external power source (to power the operation of the remote management controller 112 when the computer 110 is powered off), or both. These power sources are not illustrated in FIG. 1.

Some functionality described herein as being performed by the remote management controller 112, such as execution of the boot loader, is implemented by way of a firmware 122 stored in a memory 120 of the remote management controller 112, and as shown the firmware 122 includes the boot loader 124. The firmware 122 is executed by a central processor 118 on the remote management controller 112.

In the embodiment shown, the mass storage device 126 is a hard disk drive. Alternatively, either or both of the memory 120 and mass storage device 126 may include RAM, ROM, EPROM, EEPROM, flash memory or other solid state memory technology, DVD, HD-DVD, BLU-RAY, or other medium which can be used to store computer-accessible data such as computer-executable instructions executable by a processor to cause a computer to perform functions according to one or more aspects of the present invention disclosed herein. The functionality described herein as being provided by the remote management controller 112 is also illustrative and the remote management controller 112 may provide more or fewer functions than those described herein.

Because the management client 152 can communicate with the remote management controller 112 even when the managed host computer is powered off or unresponsive, via the dedicated network interface 114, the communications channel between the remote management controller 112 and the management client computer 110 is referred to herein as being "out-of-band." Out-of-band management is essential for determining the health of the managed host computer 110 prior to an operating system 128 being booted by the managed host computer 110 or when the operating system 128 has crashed. Out-of-band management is also useful for configuring the operation of a basic input/output system ("BIOS") of the managed host computer 110.

It should be appreciated that the managed host computer 110 may also be managed through a "side-band" communications channel. In this regard, the managed host computer 110 includes a side-band network interface controller 116 through which a management client application 152 may establish a connection with the managed host computer 110. Through this side-band communications channel, communications may be made with one or more side-band management applications 130 executing on the operating system 128. Because the operating system 128 must be executing to enable communication with the side-band management applications 130, this type of management is referred to herein as "side-band management." The side-band management applications 130 may include such management applications as the Systems Management Architecture for Server Hardware ("SMASH") or Web Services Management ("WS-MAN"). Other side-band management applications may be utilized in a similar manner.

It should be appreciated that, according to exemplary embodiments, the remote management controller 112 may be further equipped with a dynamic host configuration protocol ("DHCP") server (not shown). Through the DHCP server, the operating system 128 can request a network address, such as an Internet protocol ("IP") address 110, for the side-band network interface 116. In response to such a request, the DHCP server assigns an appropriate network address to the side-band network interface 116.

Figure 2:
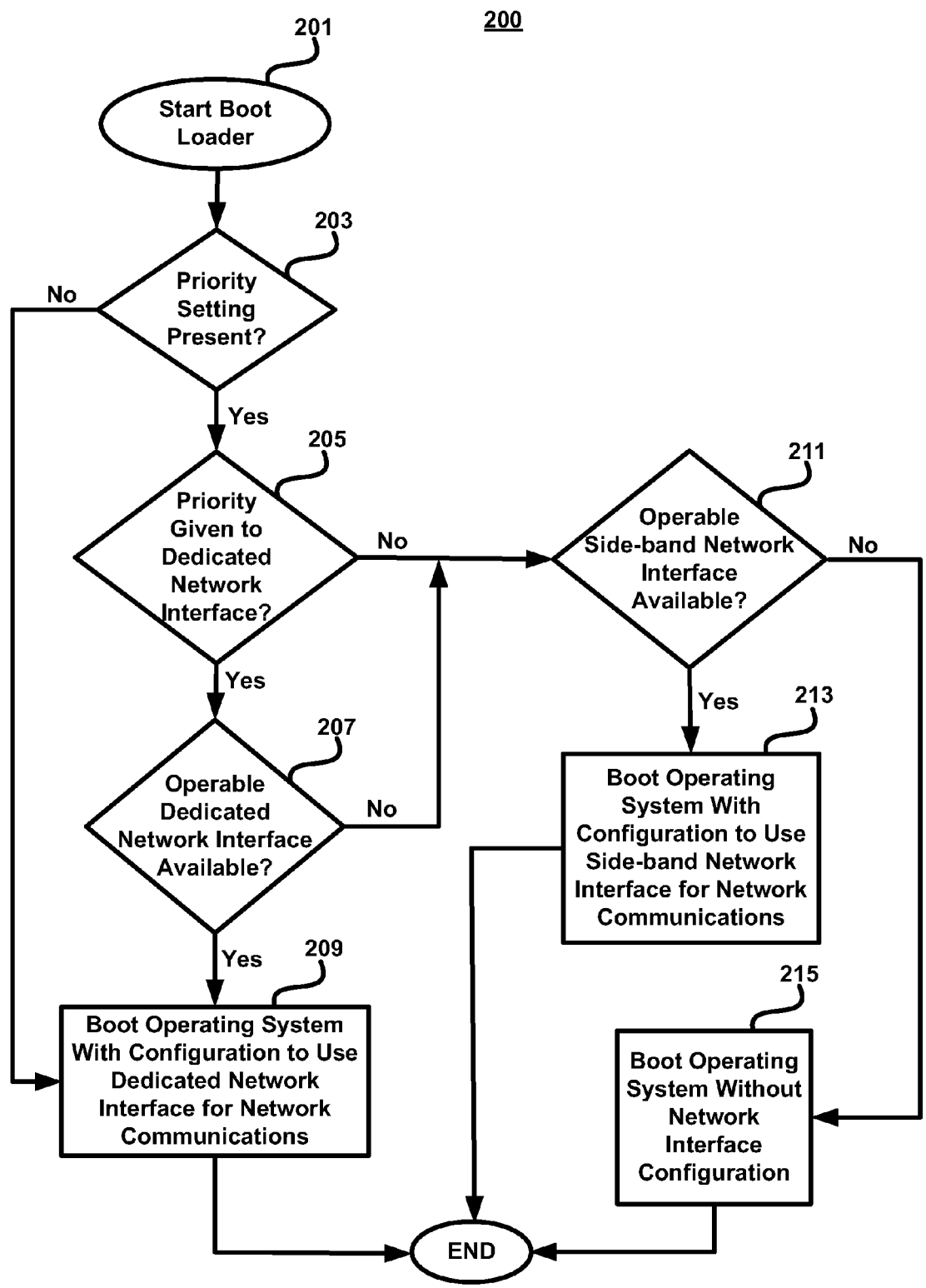
FIG. 2 is a flow chart illustrating operational steps of a method for managing network interfaces of a computer system, according to one embodiment of the present invention.

Now referring specifically to the flow chart shown in FIG. 2, in one aspect, the present invention relates to a computer-implemented method 200 for managing at least one network interface of a computer system. In one embodiment, the method includes step 201, where the execution of a boot loader is initiated. The boot loader is operative to initialize at least one of a dedicated network interface and a side-band network interface of a computer system, where each of the dedicated network interface and side-band network interface are operative to communicatively connect a management controller of the computer system to at least one hardware component of the computer system, via at least one network connection. Following step 201, at step 203 it is determined if a boot loader environment priority setting is present, where the priority setting indicates may indicate a preference for use of a dedicated network interface or a side-band network interface. If it is determined that no priority setting is present, then operation proceeds along the "no" path from step 203 to step 207. If it is determined that a priority setting is present and that the priority setting indicates a priority for use of a dedicated network interface, which corresponds to the "yes" path from step 230 to step 205, then operation proceeds along the "yes" path to step 207.

If it is determined at step 203 that a priority setting is present, but the setting does not indicate a priority for use of the dedicated network interface, as determined at step 205, then operation proceeds along the "no" path from step 205 to step 211. At step 207, it is determined if an operable dedicated network interface is available. If an operable dedicated network interface is available, then operation proceeds along the "yes" path from step 207 to step 209, where an operating system of the computer system is booted with a configuration to use the dedicated network interface for network communications, and then operational steps of the method end at 217. The step 209 of determining if an operable dedicated network interface is available can include verifying the PHY link status of a dedicated network interface.

If it is determined at step 211 that a side-band network interface is not available, then operation proceeds along the "no" path from step 211 to step 215. If it is determined at step 211 that a side-band network interface is available, the operation proceeds along the "yes" path from step 211 to step 213, where an operating system of the computer system is booted with a configuration to use the side-band network interface for network communications, and then operational steps of the method end at 217. The step 211 of determining if a side-band network interface is available can comprise verifying a PHY link status of the side-band network interface. At step 215, an operating system of the computer system is booted without any network interface configuration and the operational steps of the method end at 217.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A baseboard management controller (BMC)-implemented method for managing a dedicated network interface of the BMC and a side-band network interface of a host computer of the BMC, comprising:
   (a) initiating, at the BMC, execution of a boot loader operative to initialize one of the dedicated network interface and the side-band network interface as a communications network interface for the BMC, wherein the dedicated network interface is dedicated to provide the BMC an out-of-band communications channel to a network, and wherein the side-band network interface is operative to provide both the BMC and the host computer a communications channel to the network, wherein a remote management computer is configured to be communicatively coupled to the BMC either through a first communications path comprising the network and the initialized dedicated network interface or through a second communications path comprising the network and the initialized side-band network interface;
   (b) determining, by the boot loader, if a boot loader environment priority setting is present, the priority setting indicating a priority for initializing the dedicated network interface or the side-band network interface as the communication network interface;
   (c) in response to determining that the priority setting is present and indicates a priority for initializing the dedicated network interface:
      (i) determining, by the boot loader, if the dedicated network interface is available; and
      (ii) if the dedicated network interface is available, initializing, by the boot loader, the dedicated network interface as the communications network interface for the BMC and booting an operating system of the BMC with a configuration to use the dedicated network interface for network communications, wherein the remote management computer is configured to be communicatively coupled to the BMC through the first communications path comprising the network and the initialized dedicated network interface;
   (d) in response to determining that the priority setting is present and indicates a priority for initializing the side-band network interface, or, in response to determining that the priority setting is present, and the dedicated network interface is not available:
      (i) determining, by the boot loader, if the side-band network interface is available; and
      (ii) if the side-band network interface is available, initializing, by the boot loader, the side-band network interface as the communications network interface for the BMC and booting an operating system of the BMC with a configuration to use the side-band network interface for network communications, wherein the remote management computer is configured to be communicatively coupled to the BMC through the second communications path comprising the network and the initialized side-band network interface; and
   (e) in response to determining that the priority setting is present, and neither the dedicated network interface nor the side-band network interface is available, booting by the boot loader, an operating system of the BMC without initializing either the dedicated network interface or the side-band network interface.

2. The method of claim 1, wherein the boot loader environment priority setting is modifiable during run time through a remote management device.

3. The method of claim 2, wherein the host computer further comprises a system management bus that is operative to communicatively couple the BMC to the at least one of the dedicated network interface and side-band network interface.

4. The method of claim 1, wherein the boot loader environment priority setting is a U-Boot environment variable that is modifiable during run time.

5. The method of claim 1, wherein determining if the dedicated network interface is available and determining if the side-band network interface is available comprise verifying a PHY link status of the dedicated network interface and verifying the PHY link status of the side-band network interface, respectively.

6. The method of claim 1, wherein the BMC manages at least one of an environmental monitoring sensor, power control means, and mass storage means of the host computer.

7. The method of claim 1, wherein the baseboard management controller is communicatively coupled to a remote management computer that is operative to control operation of the baseboard management controller and communicate data associated with operations of at least one hardware component via the initialized dedicated network interface or the initialized side-band network interface.

8. A non-transitory computer-readable medium having computer-executable instructions stored thereon which, when executed by one or more processors, cause a baseboard management controller (BMC) to perform functions for managing at least one network interface, the functions comprising:
   (a) initiating, at the BMC, execution of a boot loader operative to initialize at least one of a dedicated network interface of the BMC and a side-band network interface of a host computer of the BMC as a communications network interface for the BMC, wherein the dedicated network interface is dedicated to provide the BMC an out-of-band communications channel to a network, and wherein the side-band network interface is operative to provide both the BMC and the host computer a communications channel to the network, wherein a remote management computer is configured to be communicatively coupled to the BMC either through a first communications path comprising the network and the initialized dedicated network interface, or through a second communications path comprising the network and the initialized side-band network interface;
   (b) determining, by the boot loader, if a boot loader environment priority setting is present, the priority setting indicating a priority for initializing the dedicated network interface or the side-band network interface as the communication network interface;

(c) in response to determining that the priority setting is present and indicates a priority for initializing the dedicated network interface:
  (i) determining, by the boot loader, if an operable dedicated network interface is available; and
  (ii) if the dedicated network interface is available, initializing, by the boot loader, the dedicated network interface as the communications network interface for the BMC and booting an operating system of the BMC with a configuration to use the dedicated network interface for network communications, wherein the remote management computer is configured to be communicatively coupled to the BMC through the first communications path comprising the network and the initialized dedicated network interface;

(d) in response to determining that the priority setting is present and indicates a priority for initializing the side-band network interface, or, in response to determining that the priority setting is present, and the dedicated network interface is not available:
  (i) determining, by the boot loader, if the operable side-band network interface is available; and
  (ii) if the side-band network interface is available, initializing, by the boot loader, the side-band network interface as the communications network interface for the BMC and booting an operating system of the BMC with a configuration to use the side-band network interface for network communications, wherein the remote management computer is configured to be communicatively coupled to the BMC through the second communications path comprising the network and the initialized side-band network interface; and (e) in response to determining that the priority setting is present, and neither the dedicated network interface nor the side-band network interface is available, booting by the boot loader, an operating system of the BMC without initializing either the dedicated network interface or the side-band network interface.

9. The computer-readable medium of claim 8, wherein the boot loader environment priority setting is modifiable during run time.

10. The computer-readable medium of claim 9, wherein the host computer further comprises a system management bus that is operative to communicatively couple the BMC to the at least one of the dedicated network interface and the side-band network interface.

11. The computer-readable medium of claim 8, wherein the boot loader environment priority setting is a U-Boot environment variable that is modifiable during run time.

12. The computer-readable medium of claim 8, wherein determining if the dedicated network interface is available and determining if the side-band network interface is available comprise verifying a PHY link status of the dedicated network interface and verifying the PHY link status of the side-band network interface, respectively.

13. The computer-readable medium of claim 8, wherein the BMC manages at least one of an environmental monitoring sensor, power control means, and mass storage means of the host computer.

14. The computer-readable medium of claim 8, wherein the baseboard management controller is communicatively coupled to a remote management computer that is operative to control operation of the baseboard management controller and communicate data associated with operations of at least one hardware component via the initialized dedicated network interface or the initialized side-band network interface.

15. A computer system, comprising:
(a) a management controller;
(b) a host computer;
(c) at least one of a dedicated network interface and a side-band network interface, wherein the dedicated network interface is dedicated to provide the management controller an out-of-band communications channel to a network, and wherein the side-band network interface is operative to provide both the management controller and the host computer a communications channel to the network;
(d) a programmable processor of the management controller that is programmed to:
  (i) initiate, at the management controller, execution of a boot loader operative to initialize one of the dedicated network interface and the side-band network interface as a communications network interface for the management controller, wherein a remote management computer is configured to be communicatively coupled to the management controller either through a first communications path comprising the network and the initialized dedicated network interface, or through a second communications path comprising the network and the initialized side-band network interface;
  (ii) determine, by the boot loader, if a boot loader environment priority setting is present, the priority setting indicating a priority for initializing the dedicated network interface or the side-band network interface as the communication network interface;
  (iii) in response to determining that the priority setting is present that indicates a priority for initializing the dedicated network interface:
    (1) determine, by the boot loader, if the dedicated network interface is available; and
    (2) if the dedicated network interface is available, initialize, by the boot loader, the dedicated network interface as the communications network interface for the management controller and boot an operating system of the management controller with a configuration to use the dedicated network interface for network communications, wherein the remote management computer is configured to be communicatively coupled to the management controller through the first communications path comprising the network and the initialized dedicated network interface;
  (iv) in response to determining that the priority setting is present and indicates a priority for initializing the side-band network interface, or, in response to determining that the priority setting is present, and the dedicated network interface is not available:
    (1) determine, by the boot loader, if the side-band network interface is available; and
    (2) if the side-band network interface is available, initialize, by the boot loader, the side-band network interface as the communications network interface for the management controller and boot an operating system of the management controller with a configuration to use the side-band network interface for network communications, wherein the remote management computer is configured to be communicatively coupled to the management controller through the second communications path comprising the network and the initialized side-band network interface; and (v) in response to determining that the priority setting is present, and neither the dedicated network interface nor the side-band network interface is available, boot, by the boot loader, an operating system of the management controller without initializing either the dedicated network interface or the side-band network interface.

16. The computer system of claim 15, wherein the boot loader environment priority setting is modifiable during run time.

17. The computer system of claim 15, wherein determining if the dedicated network interface is available and determining if the side-band network interface is available comprise verifying a PHY link status of the dedicated network interface and verifying a PHY link status of the side-band network interface, respectively.

18. The computer system of claim 15, further comprising a system management bus that is operative to communicatively couple the management controller to the at least one of the dedicated network interface and the side-band network interface.

19. The computer system of claim 15, wherein the management controller manages at least one of an environmental monitoring sensor, power control means, and mass storage means of the computer system.

20. The computer system of claim 15, wherein the management controller is a baseboard management controller of the host computer, wherein the baseboard management controller is communicatively coupled to a remote management computer that is operative to control operation of the baseboard management controller and communicate data associated with operations of at least one hardware component via the initialized dedicated network interface or the initialized side-band network interface.

* * * * *